United States Patent Office 3,336,812
Patented Aug. 22, 1967

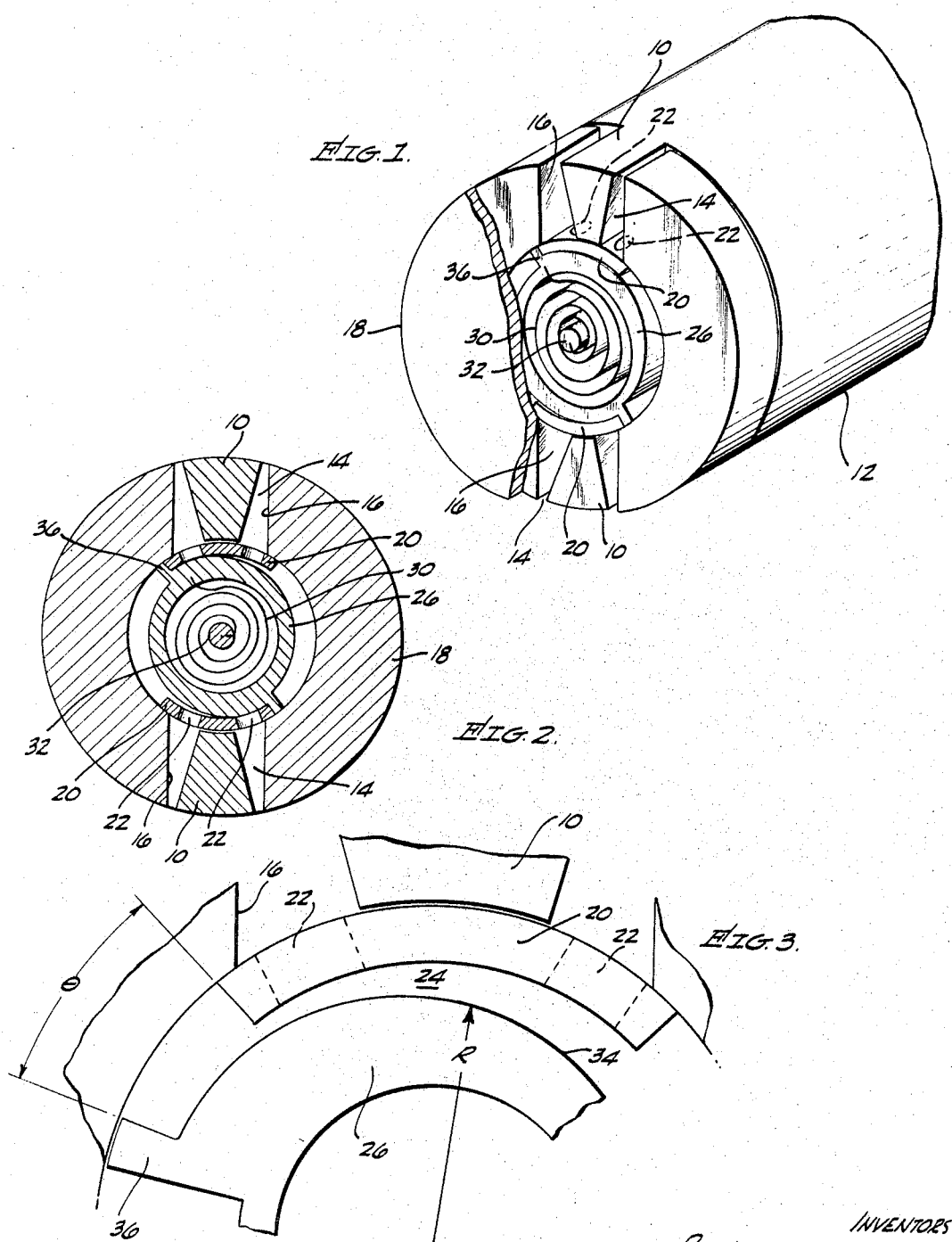

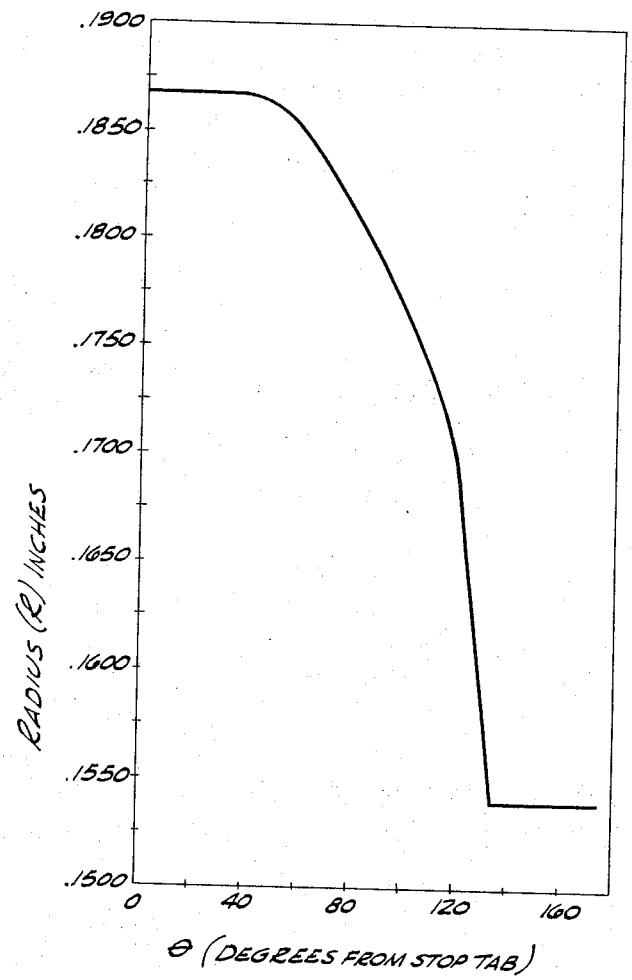

3,336,812
PADDLE DAMPING MECHANISM
Richard C. Winfrey, Los Angeles, and Curtis C. Bell, Inglewood, Calif., assignors to Hughes Aircraft Company, Culver City, Calif., a corporation of Delaware
Filed Dec. 18, 1964, Ser. No. 420,487
3 Claims. (Cl. 74—5.5)

ABSTRACT OF THE DISCLOSURE

This is an improved damping mechanism comprising one or more paddles affixed to a rotatable body each of which is arranged for movement within a chamber filled with a damping fluid to damp the movement of the rotatable body. Each chamber includes a movable wall which is supported by a spiral element of a bimetallic material which opens and closes with temperature changes to vary the position of the movable wall and correspondingly the size of a flow passage for the damping fluid.

---

This invention relates to a damping control device for movable bodies and more particularly to an improved control device incorporating a mechanical damping mechanism of the paddle type.

The damping mechanism of this invention was designed for use in oscillatory systems which operates under conditions of wide temperature deviations, and specifically for use in subminiature rate gyros and will be described primarily for that application.

When a torque is applied to the input axis of a single degree of freedom rate gyro the gimbal structure containing the gyroscopic element precesses about the output axis until it reaches a position of equilibrium. If the input torque is removed so that the entire gyro is rotating about its input axis at a constant rate the torsional spring element applies a torque to the gimbal which is just sufficient to make the gyroscopic element precess about the input axis at a rate exactly equal to the applied rate. Thus, for small angle rotations if the spring torque is a direct linear function of angle deflection and the input rate is applied gradually so as to not cause oscillations the angle of rotation of the output shaft is proportional to the input rate.

Since a rate gyro may be a single degree of freedom spring mass system its output is substantially sinusoidal at a frequency equal to the natural frequency of the spring mass system, and the gimbal oscillates about the output shaft. Thus it is necessary that some method of damping be employed so that the oscillations will be damped out quickly to give a constant output and that this method be able to maintain a constant damping ratio over a wide range of operating temperatures.

If a single degree of freedom spring mass system is freely oscillating and a damping torque is applied, the oscillations will tend to die out. If the damping torque is increased until a magnitude is just reached where the system will cease to oscillate, then the system is said to be critically damped. Damping ratio is defined as the ratio of the applied damping torque to that damping torque which would critically damp the system.

To accomplish this damping various methods such as magnetic damping, shear damping and paddle damping have been employed. While satisfactory in some operations magnetic damping has the disadvantage of requiring either large permanent magnets or electromagnets and associated power supplies to achieve the necessary damping. Mechanisms utilizing shear damping, while more common than magnetic damping, have the disadvantage of increased cost because of the close tolerances necessary in the manufacturing of the stationary and rotatable elements. In addition, because these devices use high viscosity fluid, problems are encountered in filling the gyro without introducing some small air bubbles. A good description of the application of shear damping to rate gyro devices is found in U.S. Patent No. 2,718,149.

Paddle damping which evolved from the disadvantages of shear damping is commonly used in many small rate gyros and generally consists of several paddles affixed to the gyro gimbal which move back and forth through the damping fluid producing the required damping torque. It is well to note, however, that while paddle damping produces the predominant damping torque a torque due to shear damping is also present especially at low temperatures.

Rate gyros have found wide use in the aerospace industry where they are used both in aircraft as well as missiles. Because of the operating environment of such vehicles rate gyros must be capable of satisfactory operation over a wide temperature range often as much as 250° F. Since the viscosity of the damping fluid changes drastically over such a temperature range it has been necessary to use heater elements in the gyros to keep the temperature relatively constant. While the heating of a gyro has a certain advantage this operation introduces several disadvantages as well, among these being the need to operate the gyro at a higher temperature than the highest expected ambient temperature, extra physical space required for the heaters, necessary controls and insulation and increased electrical power requirements.

While heater elements are still used in high precision integrating gyros because a very accurately maintained damping ratio is desired this invention teaches the elimination of such elements for less precise rate gyros and the substitution of a temperature compensated mechanical damping mechanism.

Therefore, it is an object of the present invention to provide an improved damping mechanism for a movable body having a substantially constant damping ratio over a wide temperature range.

It is a further object of this invention to provide an improved damping mechanism for a rotatable body immersed in a fluid in which the effect of the mechanism on the body is maintained substantially constant regardless of the effect of temperature changes on the viscosity of the fluid.

It is a still further object of this invention to provide an improved rate gyro which combines paddle damping with a variable flow path to achieve a substantially constant damping ratio over a wide temperature range.

As previously described typical paddle damping consists of one or more paddles affixed to the end of a rotatable member that move back and forth through the damping fluid. As the paddles move they act as a pump forcing fluid through a number of carefully determined clearances between moving parts. For a single degree of freedom spring mass system, desired damping occurs when the damping torque is directly proportional to velocity. This produces a damping ratio which will be constant and independent of pressure. The damping torque in paddle damping is directly proportional to the pressure differential between the two faces of the paddle. If this damping torque is achieved by the resistance to flow between parallel plates the pressure drop is directly proportional to velocity and thus the desired damping is obtained. If the damping torque is achieved by resistance to flow through an orifice, as is the common method of damping, the pressure drop is proportional to the square of the velocity and thus the damping ratio will vary according to pressure which is undesirable. By adding an additional flow path for the fluid which has less resistance to fluid flow than the other paths and by providing a means to control the magnitude of the resistance to fluid flow of this path the effect of temperature on damping fluid viscosity is compensated for and the damping ratio developed is substantially independent of pressure. To achieve this objective the improved damping mechanism of this invention comprises one or more paddles affixed to a rotatable body each of which is arranged for movement within a chamber filled with a damping fluid. Each chamber has a movable wall which is supported by a spiral element of a bimetallic material which opens and closes with temperature changes to vary the position of the movable wall and correspondingly the size of one flow passage for the fluid. In this fashion the damping ratio is maintained relatively constant and is independent of pressure, although the temperature of the damping fluid changes, because the size of one flow path is changed to compensate for changes in the viscosity of the fluid.

Other advantages of the invention will hereinafter become more fully apparent from the following description of the drawings which illustrate a preferred embodiment thereof and in which:

FIG. 1 is a perspective view of a portion of one embodiment of a rate gyro incorporating the damping mechanism of this invention and cut away to show the elements of said mechanism;

FIG. 2 is a sectional view taken through the improved damping mechanism of this invention normal to the axis of rotation of the gimbal illustrating more clearly the relationship and location of the mechanical elements;

FIG. 3 is an enlarged view of a portion of a paddle, the housing, the orifice ring and the channel width controller but omitting the spiral element to illustrate more clearly the variable width flow passage for the damping fluid; and FIG. 4 is a graph of the profile of a portion of the outer surface of the channel width controller illustrating the radius of this surface for degrees of arc from the tab.

Referring now to FIGS. 1 and 2 one embodiment of the mechanism of this invention comprises two paddles 10 each affixed to or forming an integral part of a rotating body 12 such as the gimbal structure of a rate gyro. Typically in this embodiment the gimbal structure moves through a maximum angle of 2.5° of arc. As the gimbal moves each of the paddles moves within an identical cavity or chamber 14 formed by a plurality of barrier portions 16 of a damper housing 18 and an orifice ring segment 20. Each of the orifice rings 20 may be part of the housing 18 or affixed thereto, and includes two bores or fixed diameter orifices 22, one on either side of the paddle 10. The damper housing 18 is typically attached to a rigid structure such as the case or enclosure of a rate gyro (not shown) which is filled with a suitable damping fluid such as a commercially available silicone fluid.

In addition to FIGS. 1 and 2, referring to FIG. 3, when the paddle 10 moves, a portion of the damping fluid is forced out one orifice 22 through a variable channel 24 and through the other orifice 22. The cross sectional area of the channel 24 along which the fluid flows between the orifices is determined by a channel width controller 26. The remainder of the fluid is forced around the paddle 10 through the small fixed passages or clearances existing between the paddle 10 and the walls of the cavity 14.

The angular position of the channel width controller 26 is varied proportional to temperature change by a thermal responsive spiral element 30 of a bimetallic material. One end of the spiral 30 is attached to the controller 26 and the other end is attached to a shaft 32 about which the controller rotates. The shaft 32 is affixed to the housing 18. A portion of an outer surface 34 of the controller 26 and consequently the width of the channel 24 is designed to provide nearly exact compensations for any temperature effects which affect the damping ratio of the gyro; leaving manufacturing tolerances as the only remaining uncompensated variation producing factor. Said portion of the outer surface 34 is bounded on one side by a tab 36.

For one embodiment of this invention the channel 24 has a geometry as shown in FIG. 3 and in this embodiment to provide the necessary compensation over a temperature range of 250° F. with a damping fluid such as silicone fluid, the portion of the outer surface 34 has a profile measured in radius versus angle $\theta$ from the tab 36 as shown in FIG. 4.

When the spiral element is of a conventional bimetallic material and the geometry of the mechanism is as shown for this embodiment the controller rotates 3.85° of arc for every 10° F. change of temeperature, when an initial setting of $\theta$ at 51° of arc is made in a clean atmosphere at 75° F.

While the one embodiment described above incorporates an orifice ring 20 it should be understood that this element is not critical to the function of a paddle damper as taught by this invention. The orifice ring 20 has been included in this embodiment for reasons other than the control of the damping force over a specific temperature range and if desired may be removed. However, when this is done the length of the paddle 10 must be increased so that its bottom surface will function as one side of the variable width channel 24.

While one embodiment of this invention has been illustrated it should be appreciated by those skilled in the art that variations of the disclosed arrangement both as to its details, the operation of such details and the number of damping elements may be varied without departing from the scope thereof. Accordingly, it is intended that the foregoing disclosure and the showings made in the drawings may be considered as illustrative of this invention and not construed in a limiting sense.

What is claimed is:
1. A damping mechanism for a movable body immersed in a fluid filled casing comprising:
   a housing supported by said casing and including at least one chamber;
   at least one paddle extending from one end of said movable body each into a different one of said chambers;
   a movable member spaced from each of said chambers to define with one surface of said paddles a channel; and
   a temperature responsive member attached to said movable member for movement thereof to vary the width of the channel as a function of the temperature of the fluid,
   whereby a substantially constant damping ratio is maintained by said mechanism over a predetermined range of temperature values.
2. The damping mechanism of claim 1 including an orifice ring at one end of each said chambers and having a pair of bores each positioned on a different side of one of said paddles.
3. The damping mechanism of claim 1 wherein the temperature responsive member is a spiral element of bimetallic material and affixed at one end to each of said movable members and at the other end to a rigid shaft about which said element rotates.

References Cited
UNITED STATES PATENTS

| | | | |
|---|---|---|---|
| 2,834,213 | 5/1958 | Fredricks | 74—5.5 |
| 3,113,594 | 12/1963 | Trempler | 74—5.5 X |
| 3,222,936 | 12/1965 | Talbot et al. | 74—5.5 |

FRED C. MATTERN, JR., Primary Examiner.

J. D. PUFFER, C. J. HUSAR, Assistant Examiners.